United States Patent [19]

Fergus

[11] 4,253,025

[45] Feb. 24, 1981

[54] HAND AND SHOE MONITOR USING AIR IONIZATION PROBES

[75] Inventor: Richard W. Fergus, Lombard, Ill.

[73] Assignee: The United States of America as represented by the Department of Energy, Washington, D.C.

[21] Appl. No.: 942,230

[22] Filed: Sep. 14, 1978

[51] Int. Cl.³ .............................................. H01J 39/28
[52] U.S. Cl. .................................... 250/385; 250/394
[58] Field of Search ............... 250/385, 374, 375, 379, 250/380, 336, 394; 313/93

[56] References Cited

U.S. PATENT DOCUMENTS

| 3,093,738 | 6/1963 | Mann et al. | 250/374 |
|---|---|---|---|
| 3,372,295 | 3/1968 | Sparks | 250/336 |
| 3,383,538 | 5/1968 | Bowyer | 250/385 |
| 3,418,474 | 12/1968 | Spergel et al. | 250/385 |
| 3,509,339 | 4/1970 | Doehner | 250/336 |
| 4,047,040 | 9/1977 | Houston | 250/385 |

OTHER PUBLICATIONS

Jones, "A Personal Contamination Monitor Using Large Area Geiger Counters", Health Physics, Pergaman Press, vol. 28, No. 5, May 1975, pp. 521-527.

*Primary Examiner*—Alfred E. Smith
*Assistant Examiner*—Carolyn E. Fields
*Attorney, Agent, or Firm*—James E. Denny; Frank H. Jackson; Paul A. Gottlieb

[57] ABSTRACT

A hand and shoe radiation monitor is provided which includes a probe support body defining a plurality of cells, within each cell there being an ionization probe. The support body provides structural strength for protecting the ionization probes from force applied to the support body during a radiation monitoring event. There is also provided a fast response time amplifier circuit for the output from the ionization probes.

3 Claims, 5 Drawing Figures

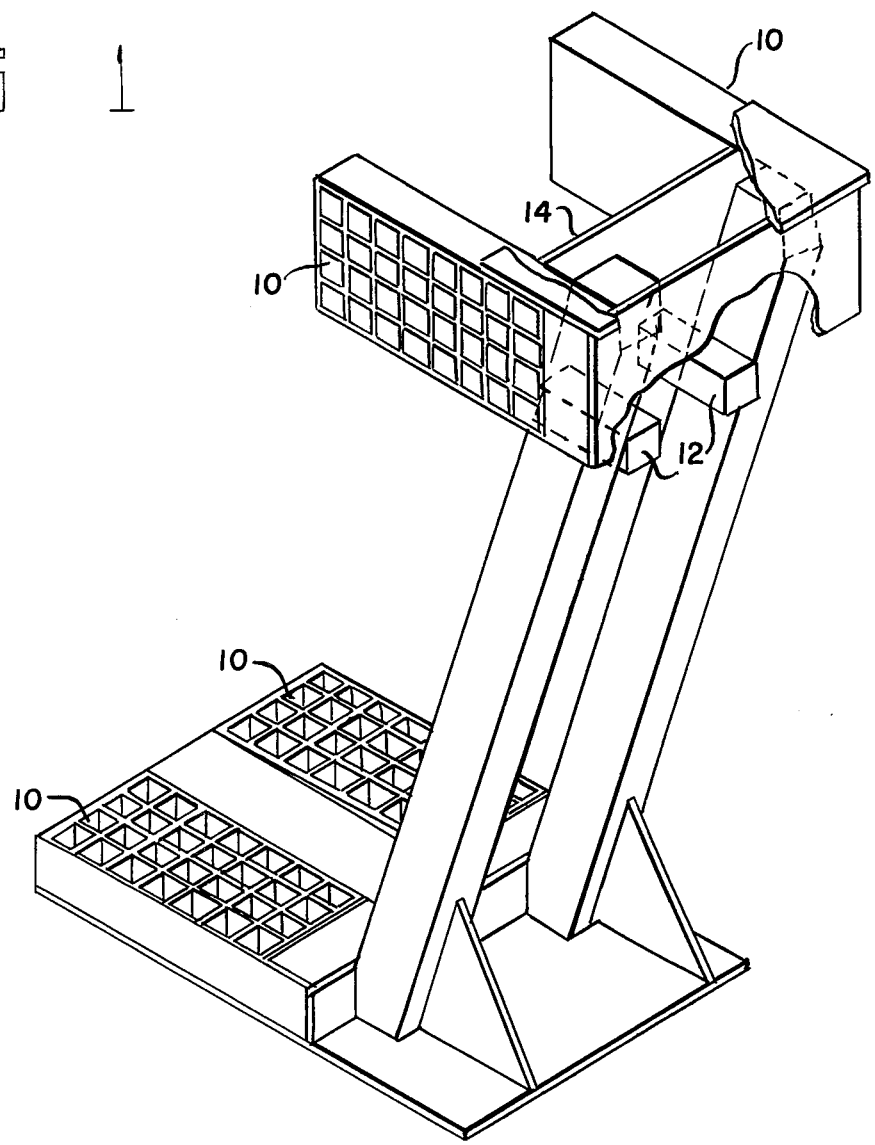
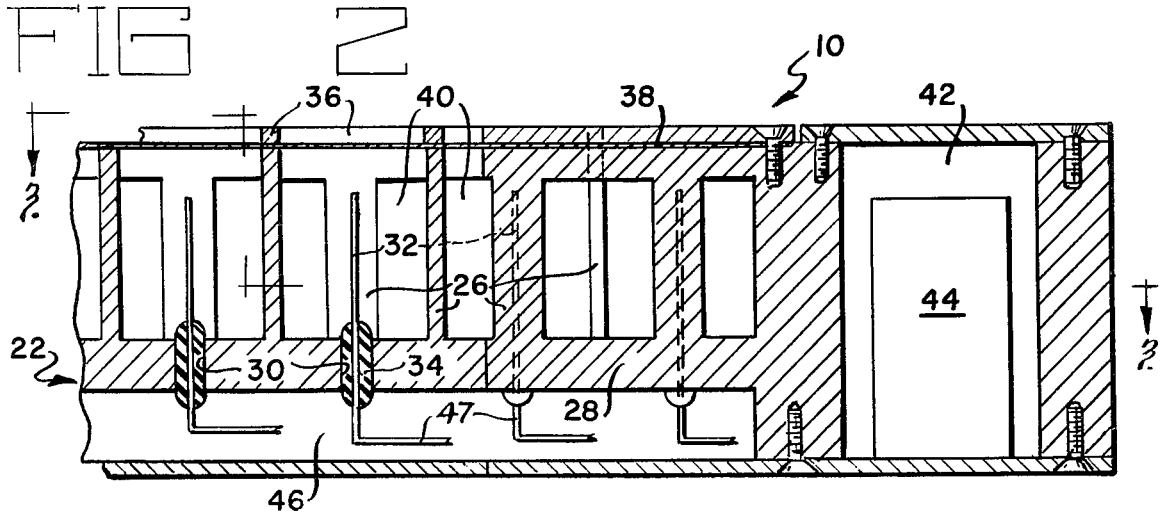

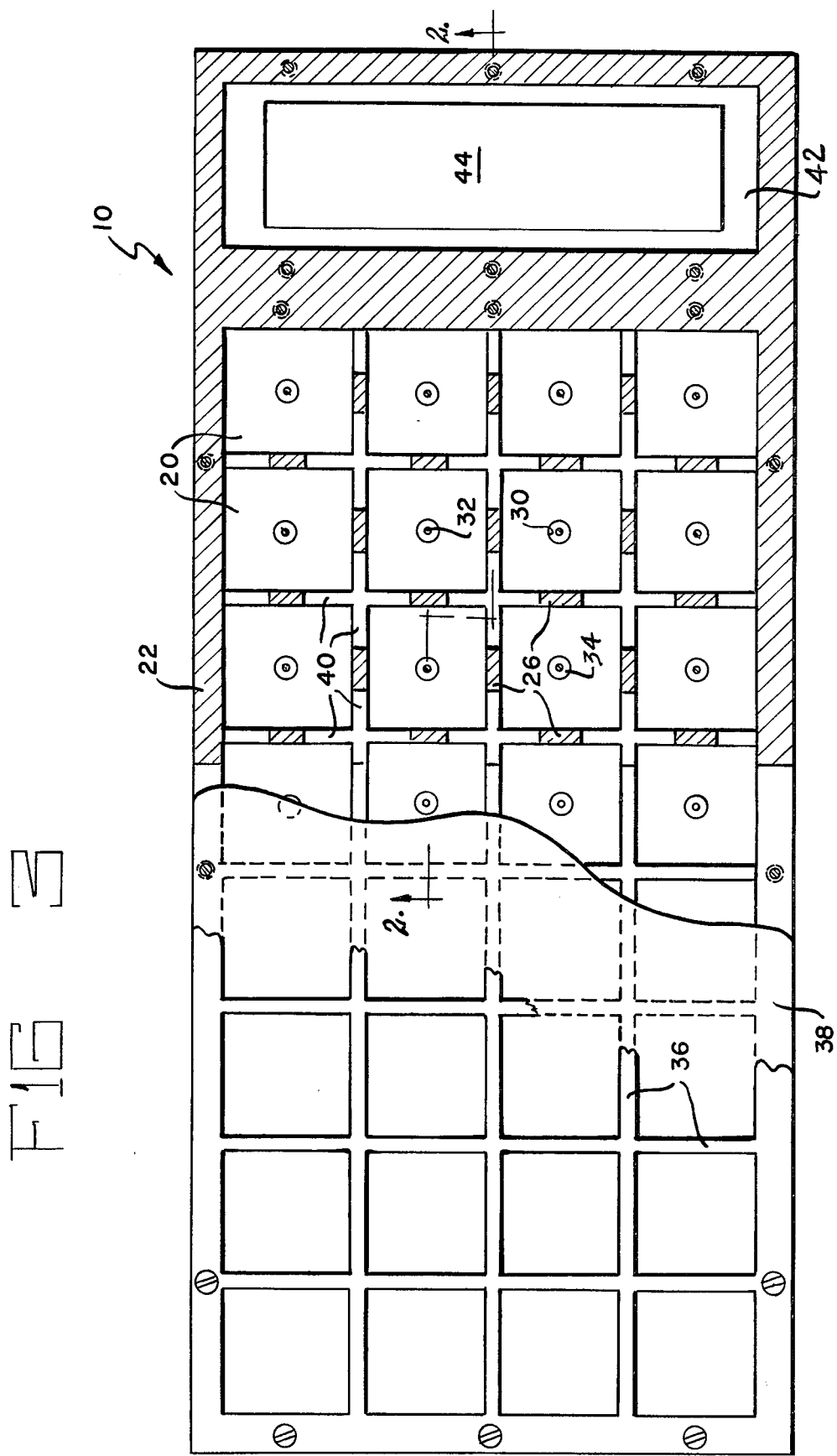

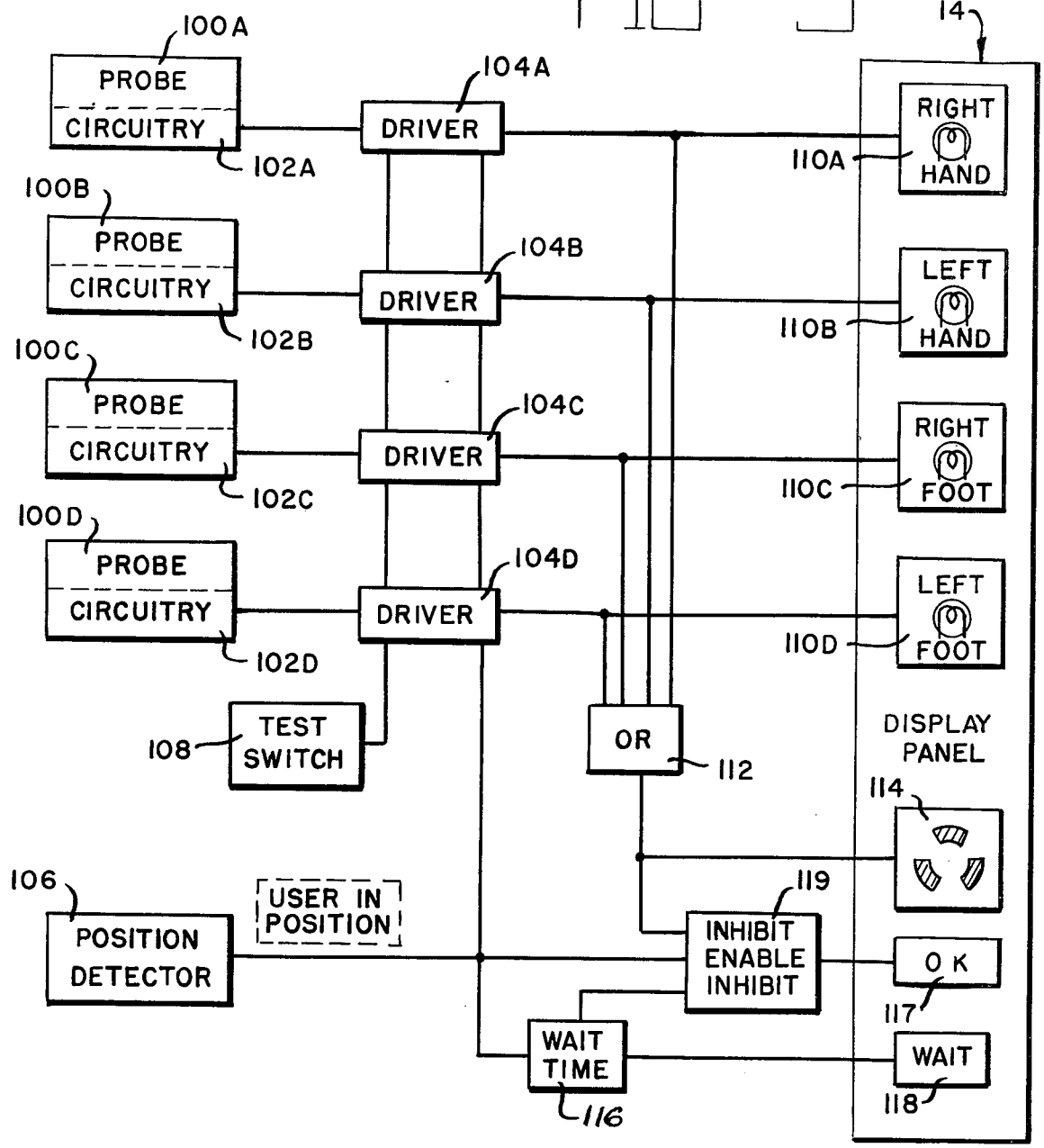

HAND AND SHOE MONITOR USING AIR IONIZATION PROBES

CONTRACTUAL ORIGIN OF THE INVENTION

The invention described herein was made in the course of, or under, a contract with the UNITED STATES DEPARTMENT OF ENERGY.

BACKGROUND OF THE INVENTION

Hand and shoe monitors for detecting alpha and beta radiation are an essential part of a radiation protection program in facilities where there is a high probability for radioactive contamination of personnel or laboratory property. Through the years hand and shoe monitors have progressed from Gm tubes and simple count rate indicators to more sophisticated scintillation or gas flow proportional probes with complex counting and background compensation circuitry. Ionization chambers have not seriously been considered for this application, probably, because of the slow input response time of low-level ionization chamber input circuitry and undesirable background electrical signals from window vibration due to user contact, especially when the user steps on the probe.

It is therefore an object of this invention to provide an improved hand and shoe radiation monitor.

Another object of this invention is to provide a hand and shoe radiation monitor which utilizes ionization probes.

SUMMARY OF THE INVENTION

There is provided an improved hand and shoe radiation monitor which utilizes air ionization probes as the detecting medium. The monitor includes a probe support body which includes structural elements which form walls defining a multiplicity of cells. Within each cell is an individual ionization probe. The walls of the cell protect the probes from force applied thereto by the user. The small area of each probe reduces the effect of window vibration on the operation of the device. The output of each ionization probe is coupled together and applied to a fast response time input circuit which distinquishes between unwanted events and the low-level desired events from the hand and shoe.

BRIEF DESCRIPTION OF THE DRAWINGS

FIG. 1 is a pictorial representation of a hand and shoe monitor;

FIG. 2 and FIG. 3 are cross sections of a single monitor assembly;

FIG. 5 is a block diagram of the alarm circuitry of the monitor.

DETAILED DESCRIPTION OF THE INVENTION

Figure 4:
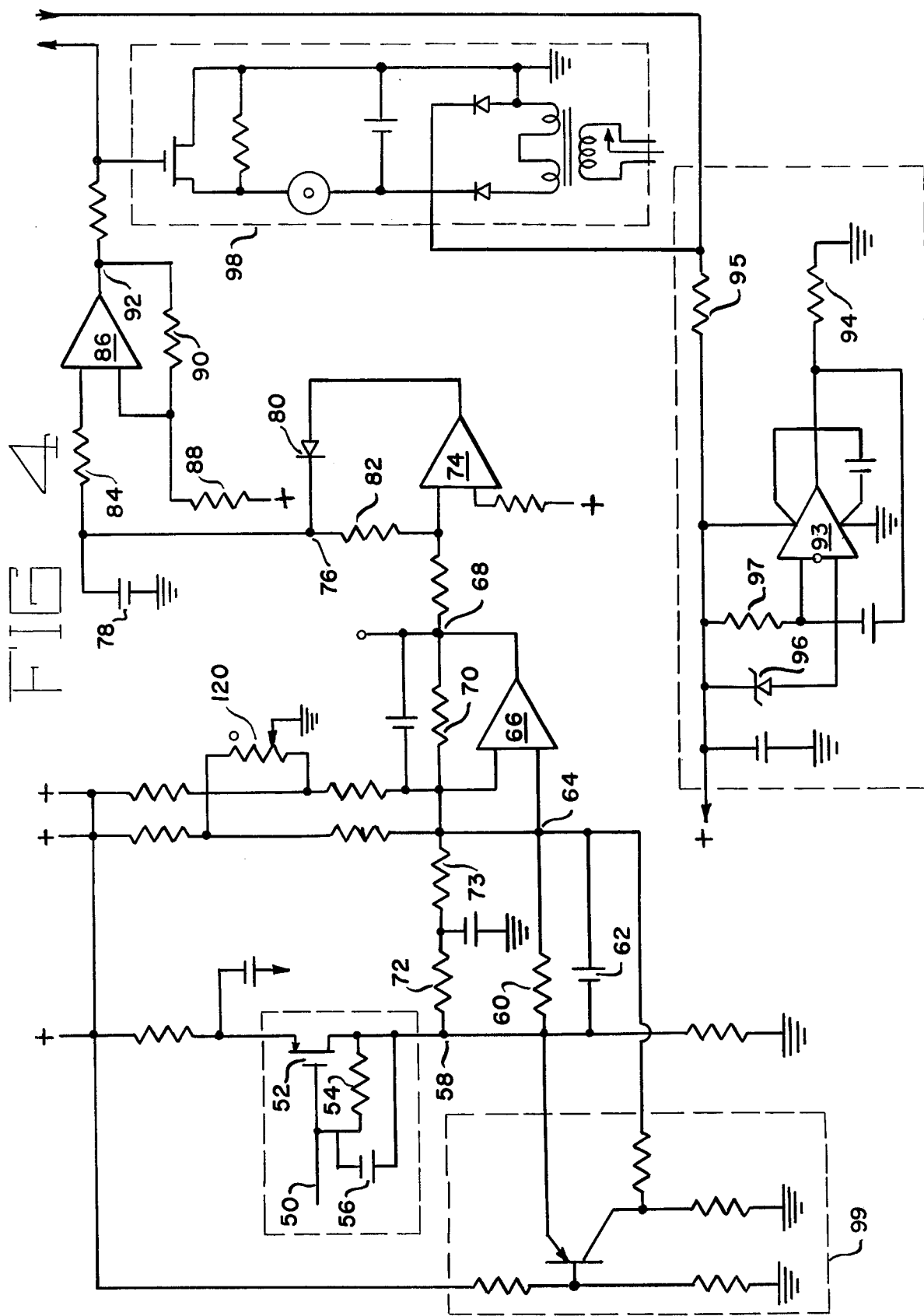
FIG. 4 is a schematic of the fast response time circuitry at the monitor.

Referring to FIG. 1, there is shown a view of a hand and shoe radiation monitor which is responsive to alpha, beta, and gamma radiation. The monitor shown includes four separate probe assemblies 10, one for each hand and each shoe. Ultrasonic detectors 12 are utilized to detect the presence of a user on the monitor and initiates a testing cycle, as will be described. A display panel 14 informs the user of the testing cycle progress. The displayed signals will be more fully described.

Each probe 10 is more particularly illustrated in FIG. 2 and FIG. 3. Each probe assembly includes a multicell ionization chamber that minimizes window movement. Each cell 20 is defined by the frame of a one-piece support body 22 which may, for example, be of cast aluminum. Body 22 is formed so that it includes a gridwork which forms the walls 26 and bottom 28 of each cell 20. Projecting through a hole 30 in each bottom 28 into each cell 20 is an ionization probe 32 which basically consists of a thin conductive wire extending through hole 30 and insulated therefrom by insulator 34. Insulator 34 may be, for example, of Teflon. A matched grill 36 holds a window 38 in direct contact with the top of the cell walls. The window 38, which may be, for example, of aluminized Mylar, is a thin conductive material which contains or forms the electrical field in each cell while allowing the radiation, especially alpha particles, to pass through with little attenuation, and protects each cell. Grill 36 and the cell walls 26 provide a sturdy surface for a user to stand on. Each wall 26 is provided with openings 40 to increase the path available for beta particle ionization. A compartment 42 is provided in body 22 to house the electronic circuitry 44 and another compartment 46 is provided to allow coupling of the leads 47 from each probe to form one input line to circuitry 44.

Referring to FIG. 4, there is shown more particularly the circuitry for each probe. All individual ionization probes are coupled together to form a single input line 50 to the electronic circuitry. The circuit shown in FIG. 4 provides a response time sufficient to allow an air ionization probe to be utilized for a personal hand and shoe monitor. Input amplifier 52 responds to the collected ion current as detected by the feedback network comprised of resistor 54 and the equivalent capacitance 56. Equivalent capacitance 56 is of a value chosen to be an equivalent capacitance which includes the sum of the parasitic capacitance from the placement of resistor 54 in the chamber 46 and the equivalent chamber capacitance as reduced by the feedback action of amplifier 52. Amplifier 52 and resistor 54 are placed in chamber 46 to reduce the necessity for a good insulator for the line from chamber 46 to chamber 42. With a large feedback resistance 54 (about 10 teraohms) required for the low level of signal from input line 50 and an equivalent capacitance 56 of about 10 picofarad, the response time of the signal at point 58 is about 100 seconds. This long response time is nullified by sensing the current through a time constant determined by resistor 60 and capacitor 62 of similar value to the time constant of resistor 54 and capacitance 56. The current at point 64 is equal to the input or collected ion current of line 50 multiplied by the ratio of the value of resistor 54 to the value of resistor 60, or similarly the value of capacitance 62 to that of capacitance 56.

Current mode operational amplifiers respond to the input current differential rather than the voltage differential like a conventional operational amplifier. Current mode operational amplifier 66 responds to the current at point 64 with the appropriate voltage at point 68 to generate a current through resistor 70 equal to the current at point 64. A current through resistors 72 and 73 is applied to amplifier 66 as the other input to compensate for the background level and chamber bias level at point 58. As a result the voltage at point 68 represents the instantaneous differential ion chamber current with respect to the average background level. Individual alpha particles from body 22 and cosmic rays produce large positive pulses at point 68. These large background pulses should not cause an alarm signal, while the smaller changes at point 68 between these background events become the basis for an alarm signal. This rejection is accomplished by current mode operational amplifier 74 which responds rapidly to decreasing changes at point 68 while responding slowly to increasing changes, thus distinguishing between background and nonbackground events. This operation is noted at point 76 as amplifier 74 charges capacitor 78 through the diode 80 when the voltage at point 68 decreases. When the voltage at point 68 increases, the voltage across capacitor 78 will follow slowly as determined by the resistor 82, resistor 84, and capacitor 78 time constant. The voltage at point 76 will tend to follow the minimum voltage at point 68, but with opposite polarity of change. Essentially, point 76 represents changes of the average ion chamber current minus the individual events effects. The current mode amplifier 86 generates the alarm signal when the current through resistor 84 is equal to the current predetermined through resistor 88. Positive feedback current through resistor 90 improves the switching action and eliminates possible flutter of the alarm signal at point 92.

The power for each probe circuit is regulated by circuitry contained within each probe. Current mode operational amplifier 93 forms a shunt regulator with the load resistance 94. An appropriate current is conducted through amplifier 93, resistor 94, and resistor 95 to make the zener current through diode 96 and the current through resistor 97 equal, thus regulating the power buss (+) to 15 volts. Other power sources can be accommodated by selecting a value of resistor 95 which is equal to 77 ohms/volt for the difference between 15 volts and the alternate power source. To make a probe self contained, an internal indicator and power supply 98 may be provided. Circuitry 99 forces an alarm output if the background level exceeds a level where circuit operation is improper (i.e. amplifier 52 near saturation.)

Where four probes are coupled together to operate as a hand and shoe monitor, internal circuitry 98 is deleted and a central control and power supply is utilized.

Referring to FIG. 5, there is shown a block diagram which illustrates the control features incorporated in a monitor in which all the probes are in effect tied together. There are four probe assemblies 100A, 100B, 100C and 100D with each assembly having its output circuitry 102A-D, according to FIG. 4. The output of each circuit 102 is applied to indicator light drivers 104A-D which drive lights 110A-D on the display panel. The alarm outputs drive the indicators when ultrasonic detector 106 indicates a user is present by enabling the drivers 104 so that circuitry 102 can light lights 110. Test switch 108 is provided to allow circuitry 102 to light lights 110 at any time. Each light corresponds to one of extremities monitored. When an alarm signal is generated for an extremity, an indicator light 110 on display panel 14 of FIG. 1 will be lit up. In addition, if any of the indicators indicates an alarm, OR 112 will light up a general warning light 114. Ultrasonic position detector 106 initiates the test cycle with a user in position by unlocking the drivers activating clock 116 and wait light 118 which tells the user to remain in place for the desired time period until the cycle is completed. When the cycle is complete with no alarm the OK light 117 is activated by control 119.

Each probe is calibrated by adjusting the value of resistor 120 of FIG. 4 until an acceptable number of false alarms occur. During this calibration test switch 108 is on. Statistically one knows how many background events should occur.

In addition to the initial low cost, the maintenance cost will be very low for the disclosed monitor as a gas supply is not required and the monitor will function with small holes or cuts in the Mylar window. There are no predictable failure modes other than window damage by careless users. No maintenance is required and readjustment should not be necessary, although periodic checks should be made to assure maximum efficiency. Only one adjustment per probe is required and that adjustment does not require test equipment. A probe requires minimal expertise and facilities to fabricate and maintain.

The embodiments of the invention in which an exclusive property or privilege is claimed are defined as follows:

1. A radiation monitor, comprising: a plurality of air ionization probes, a chambered grill-type probe body, one of each of such probes being mounted in each chamber of said probe body such that the grill work of said body provides structural strength for protecting said probes from force applied to said body during a radiation monitoring event, a thin conductive window covering one open side of the chambers, circuit means responsive to radiation events detected by said probes to develop an output signal corresponding thereto, and a grill matched to the grill work of said probe body and coupled to said body so that said window is between said grill and said body.

2. The monitor of claim 1 wherein said circuit means includes a conventional amplifier to which the output of said probes is applied, a resistor of value $R_1$ and a capacitance of value $C_1$ coupled in parallel with said conventional amplifier, a resistor of value $R_2$ and a capacitance of value $C_2$ coupled in parallel with each other and in series with said conventional amplifier with $R_1C_1=R_2C_2$, a first current mode amplifier with one input thereof coupled in series with said $R_2$ resistor and said $C_2$ capacitance, a resistance of value $R_3$ coupled between the other input of said first current mode amplifier and the output of said conventional amplifier, a resistance of value $R_4$ coupled in parallel with said first current mode amplifier, so that the output of said first current mode amplifier corresponds to the instantaneous differential current from said probes with respect to an average background level, and means coupled to said first current mode amplifier responsive to particular changes in the output of said first current mode amplifier to generate an alarm signal.

3. The monitor of claim 2 wherein said means coupled to said first current mode amplifier includes a second current mode amplifier to one input of which is applied the output of said first current mode amplifier, a diode and a capacitance of value $C_3$ coupled in series with the output of said second amplifier so that $C_3$ is charged with decreases in the output of said first current mode amplifier and discharges slowly through a resistance of value $R_5$ and said capacitance of value $C_3$ with increases in the output of said first current mode amplifier, and a comparator which generates an alarm signal with the voltage across $C_3$ equal to or greater than a predetermined value.

* * * * *